US012569938B2

(12) United States Patent (10) Patent No.: US 12,569,938 B2
Lee et al. (45) Date of Patent: Mar. 10, 2026

(54) DEVICE AND METHOD FOR INSPECTING WELDED STATE

(71) Applicant: LG Energy Solution, Ltd., Seoul (KR)

(72) Inventors: Jung Hoon Lee, Daejeon (KR); Seok Jin Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 83 days.

(21) Appl. No.: 18/283,254

(22) PCT Filed: Apr. 19, 2022

(86) PCT No.: PCT/KR2022/005617
§ 371 (c)(1),
(2) Date: Sep. 21, 2023

(87) PCT Pub. No.: WO2022/260268
PCT Pub. Date: Dec. 15, 2022

(65) Prior Publication Data
US 2024/0091884 A1 Mar. 21, 2024

(30) Foreign Application Priority Data

Jun. 11, 2021 (KR) ........................ 10-2021-0075923
Apr. 11, 2022 (KR) ........................ 10-2022-0044832

(51) Int. Cl.
*B23K 31/12* (2006.01)
*B23K 31/02* (2006.01)
(52) U.S. Cl.
CPC .............. *B23K 31/12* (2013.01); *B23K 31/02* (2013.01)

(58) Field of Classification Search
None
See application file for complete search history.

(56) References Cited

U.S. PATENT DOCUMENTS

| 2017/0322168 A1 | 11/2017 | Lupienski et al. |
| 2019/0126407 A1 | 5/2019 | Cho et al. |
| 2019/0240788 A1 | 8/2019 | Park et al. |

FOREIGN PATENT DOCUMENTS

| CN | 1996028 A | 7/2007 |
| CN | 104062574 A | 9/2014 |
| CN | 209417263 U | 9/2019 |
| CN | 111094958 A | 5/2020 |
| CN | 111308214 A | 6/2020 |

(Continued)

OTHER PUBLICATIONS

International Search Report for PCT/KR2022/005617 mailed Jul. 18, 2022. 3 pages.

(Continued)

*Primary Examiner* — Devang R Patel
(74) *Attorney, Agent, or Firm* — Lerner David LLP

(57) ABSTRACT

A device for inspecting a welded state between a tab, which protrudes from a plurality of electrodes stacked with a separator therebetween, and a lead welded to the tab. The device for inspecting a welded state may include a pair of tab probes, which are in contact with the tab and spaced apart from each other in a width direction of the tab, and a pair of lead probes which are in contact with the lead and spaced apart from each other in a width direction of the lead. Related methods for inspecting the welded state between a tab and a lead thereby are provided.

15 Claims, 7 Drawing Sheets

(56)          References Cited

FOREIGN PATENT DOCUMENTS

| | | | | | |
|---|---|---|---|---|---|
| CN | 212622817 | U | | 2/2021 | |
| JP | S62231150 | A | | 10/1987 | |
| JP | S63199058 | U | | 12/1988 | |
| JP | 2006239706 | A | | 9/2006 | |
| JP | 2008254005 | A | | 10/2008 | |
| JP | 2010266299 | A | | 11/2010 | |
| JP | 4844650 | B2 | | 12/2011 | |
| JP | 2011240368 | A | | 12/2011 | |
| JP | 2013180332 | A | | 9/2013 | |
| JP | 6428887 | B1 | | 11/2018 | |
| JP | 2019056672 | A | * | 4/2019 | ............ G01N 27/04 |
| JP | 2019060769 | A | | 4/2019 | |
| KR | 20070044647 | A | | 4/2007 | |
| KR | 20100030929 | A | * | 3/2010 | ............ B23K 11/25 |
| KR | 101125216 | B1 | | 3/2012 | |
| KR | 20170125707 | A | | 11/2017 | |
| KR | 101824635 | B1 | | 2/2018 | |
| KR | 20180122115 | A | | 11/2018 | |
| KR | 20190049060 | A | | 5/2019 | |
| KR | 20200058399 | A | | 5/2020 | |
| KR | 20200070765 | A | | 6/2020 | |
| WO | WO-2008019708 | A1 | * | 2/2008 | ............ B23K 11/25 |
| WO | 2019059395 | A1 | | 3/2019 | |
| WO | 2021090792 | A1 | | 5/2021 | |

OTHER PUBLICATIONS

Extended European Search Report including Written Opinion for Application No. 22820397.2 dated May 26, 2025. 10 pages.
Search Report dated Nov. 12, 2025 from the Office Action for Chinese Application No. 202280025815.8 issued Nov. 15, 2025, 3 pages.

* cited by examiner

DEVICE AND METHOD FOR INSPECTING WELDED STATE

CROSS-REFERENCE TO RELATED APPLICATIONS

The present application is a national phase entry under 35 U.S.C § 371 of International Application No. PCT/KR2022/005617 filed Apr. 19, 2022, which claims priority from Korean Patent Application Nos. 10-2021-0075923, filed on Jun. 11, 2021, and 10-2022-0044832, filed on Apr. 11, 2022, all of which are incorporated herein by reference.

TECHNICAL FIELD

The present invention relates to a device and method for inspecting a welded state between a tab, which protrudes from a plurality of electrodes stacked with a separator therebetween, and a lead welded to the tab.

BACKGROUND ART

In general, secondary batteries refer to batteries that are chargeable and dischargeable unlike non-rechargeable primary batteries, and are widely used in electronic devices such as mobile phones, notebook computers, and camcorders, or electric vehicles, etc. In particular, a lithium secondary battery has a larger capacity and a higher energy density per unit weight than a nickel-cadmium battery or a nickel-hydrogen battery, and thus utilization thereof is on a rapidly increasing trend.

The lithium secondary battery may be also classified according to the configuration of an electrode assembly in a positive electrode/separator/negative electrode structure. Representative examples may include a jelly-roll-type electrode assembly in a configuration where long sheet-shaped positive electrodes and negative electrodes are wound with a separator interposed therebetween, a stacked type electrode assembly in which a plurality of positive and negative electrodes cut into units having a predetermined size are stacked in sequence with a separator interposed therebetween, and a stacked/folded type electrode assembly in a configuration where bi-cells or full-cells are wound which have positive and negative electrodes in a predetermined unit stacked with a separator interposed therebetween, and so on.

Recently, a pouch type battery, which has a structure in which the stacked type or stacked/folded type electrode assembly is embedded in a pouch-shaped battery case made of an aluminum laminate sheet, attracts a lot of interest for reasons such as low manufacture cost, small weight, and easy change in shape, and use thereof also gradually increases.

In such a lithium secondary battery, a lithium-based oxide and a carbon material are mainly used as a positive electrode active material and a negative electrode active material, respectively. The lithium secondary battery is provided with an electrode assembly, in which a plurality of electrodes coated respectively with the electrode active materials are disposed with a separator therebetween, and an exterior material which seals and accommodates the electrode assembly together with an electrolyte.

FIG. 1 is a perspective view of a general electrode assembly.

An electrode assembly 10 is provided with a plurality of tabs 20 extending from a plurality of electrodes, and each of the plurality of tabs 20 is welded to a lead 30, respectively.

Here, the plurality of tabs 20 may include a plurality of positive electrode tabs extending from a plurality of positive electrodes, and a plurality of negative electrode tabs extending from a plurality of negative electrodes. The lead 30 connected to the plurality of positive electrode tabs may be a positive electrode lead, and the lead 30 connected to the plurality of negative electrode tabs may be a negative electrode lead. FIG. 1 illustrates the electrode assembly 10 in which the positive electrode tab and the negative electrode tab protrude in opposite directions. However, the electrode assembly 10 is not limited thereto, and may also have a configuration in which the positive electrode tab and the negative electrode tab protrude in the same direction.

When the tabs 20 and the leads 30 are welded, a weld defect occurs when welding is weakly performed between any two of the tabs 20 or between the tab 20 and the lead 30. Thus, there is a need for a process for inspecting whether there is the weld defect caused by weak-welding.

According to the related art, a method of pulling a welded object in opposite directions around a welded portion to measure tensile strength is used as a method for inspecting weak-welding defect in the welded portion. However, there is a limit to such a method in that during the measuring the tensile strength, the tab 20 and the lead 30 are damaged, and thus an error is highly likely to occur and an exhaustive inspection is impossible.

Thus, there is a need for the technical development of an inspecting device, which can perform the exhaustive inspection and has an excellent detection power, to inspect whether the welded portion is weakly welded.

DISCLOSURE OF THE INVENTION

Technical Problem

One purpose of the present invention to solve the problem is to provide a device and a method for inspecting a welded state, which can precisely and accurately determine a welded state between a tab and a lead and can perform the exhaustive inspection.

Technical Solution

The device for inspecting a welded state according to an embodiment of the present invention may inspect the welded state between a tab, which protrudes from a plurality of electrodes stacked with a separator therebetween, and a lead welded to the tab.

The device for inspecting a welded state may include a pair of tab probes, which are in contact with the tab and spaced apart from each other in a width direction of the tab, and a pair of lead probes which are in contact with the lead and spaced apart from each other in a width direction of the lead.

The device for inspecting a welded state may further include a control unit that determines weak-welding on the basis of a first resistance value between the pair of tab probes, a second resistance value between one tab probe and one lead probe, and a third resistance value between the other tab probe and the other lead probe.

The control unit may determine the weak-welding when at least one of the first resistance value, the second resistance value, or the third resistance value exceeds a preset critical resistance value.

The device for inspecting a welded state may further include a control unit that determines weak-welding on the basis of a first resistance value between the pair of tab probes, a second resistance value between one tab probe and one lead probe, a third resistance value between the other tab probe and the other lead probe, and a fourth resistance value between the pair of lead probes.

The tab probe and the lead probe may be disposed to face each other with the tab and the lead therebetween.

The pair of tab probes may be in contact with two side portions in the width direction of the tab, and the pair of lead probes may be in contact with two side portions in the width direction of the lead.

Each of the tab probe and the lead probe may include a pair of probe members, one of which applies a current and the other of which detects a voltage. Each of the probe members may have an end provided with: a tip in contact with the tab or the lead and having a sharp shape; or an opposing surface facing the tab or the lead, and a plurality of protrusions protruding from the opposing surface to be in contact with the tab or the lead.

One of the tab probe and the lead probe may include the pair of probe members which each have an end provided with the tip, and the other of the tab probe and the lead probe may include the pair of probe members which each have an end provided with the opposing surface and the plurality of protrusions.

Each of the tab probe and the lead probe may further include a spring that applies an elastic force so that the probe member protrudes.

A method for inspecting a welded state according to an embodiment of the present invention may inspect the welded state between a tab, which protrudes from a plurality of electrodes stacked with a separator therebetween, and a lead welded to the tab. The method for inspecting a welded state may include allowing a pair of lead probes to be in contact with the lead and allowing a pair of tab probes to be in contact with the tab; measuring a first resistance value between the pair of tab probes, a second resistance value between one tab probe and one lead probe, and a third resistance value between the other tab probe and the other lead probe; and determining weak-welding on the basis of the first resistance value, the second resistance value, and the third resistance value.

In the determining, the weak-welding may be determined when at least one of the first resistance value, the second resistance value, or the third resistance value exceeds a preset critical resistance value.

In the measuring of the resistance, a fourth resistance value between the pair of lead probes may be further measured, and in the determining, the fourth resistance value may be further considered to determine the weak-welding.

In the allowing of the probes to be in contact, the pair of lead probes may be in contact with two side portions in the width direction of the lead, and the pair of tab probes may be in contact with two side portions in the width direction of the tab.

In the allowing of the probes to be in contact, the lead probe and the tab probe may be disposed to face each other with the tab and the lead therebetween.

Each of the tab probe and the lead probe may include a pair of probe members, one of which applies a current and the other of which detects a voltage. One of the tab probe and the lead probe may include the pair of probe members which each have an end provided with a tip. The other of the tab probe and the lead probe may include the pair of probe members which each have an end provided with an opposing surface facing the tab or the lead, and a plurality of protrusions protruding from the opposing surface.

In the allowing of the probes to be in contact, the plurality of protrusions may be in contact with one of the tab or the lead, and then the tip may be in contact with the other of the tab or the lead.

An area, in which the lead and the tab face each other, may include a central area disposed in a center in the width direction and having welding beads formed therein; a side area disposed in each of two end portions in the width direction and having the welding beads formed therein; and a contact area disposed between the central area and the side area and having no welding beads formed therein. In the allowing of the probes to be in contact, the lead probe and the tab probe may be in contact with the contact area.

Advantageous Effects

According to a preferred embodiment of the present invention, the resistance measurement method is used to inspect the welded state, and thus there are advantageous effects that the destructive inspection by tension, etc. do not need to be performed and the exhaustive inspection can be achieved.

In addition, the weak-welding is determined on the basis of the plurality of resistance values measured by the pair of tab probes and the pair of lead probes, and thus there is an advantageous effect that more precise and accurate measurement can be performed when compared to the method according to the related art in which the weak-welding is determined on the basis of the single resistance value between the pair of probes.

MODE FOR CARRYING OUT THE INVENTION

Figure 1:
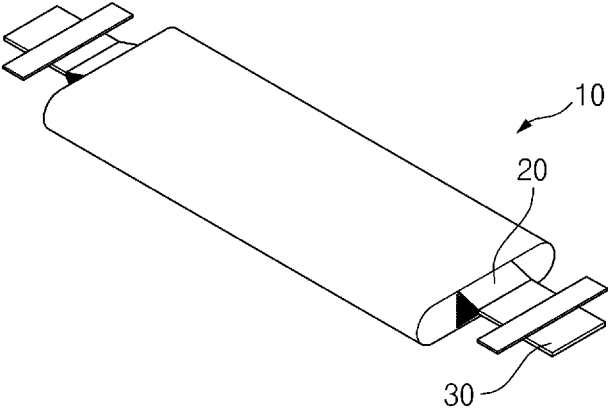
FIG. 1 is a perspective view of a general electrode assembly.

Hereinafter, preferred embodiments of the present invention will be described in detail with reference to the accompanying drawings to enable those skilled in the art to which the present invention pertains to easily carry out the present invention. The present invention may, however, be embodied in different forms and should not be construed as limited by the embodiments set forth herein.

The parts unrelated to the description, or the detailed descriptions of related well-known art that may unnecessarily obscure subject matters of the present invention, will be ruled out in order to clearly describe the present invention. Like reference numerals refer to like elements throughout the whole specification.

Moreover, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe his or her invention in the best ways.

Figure 2:
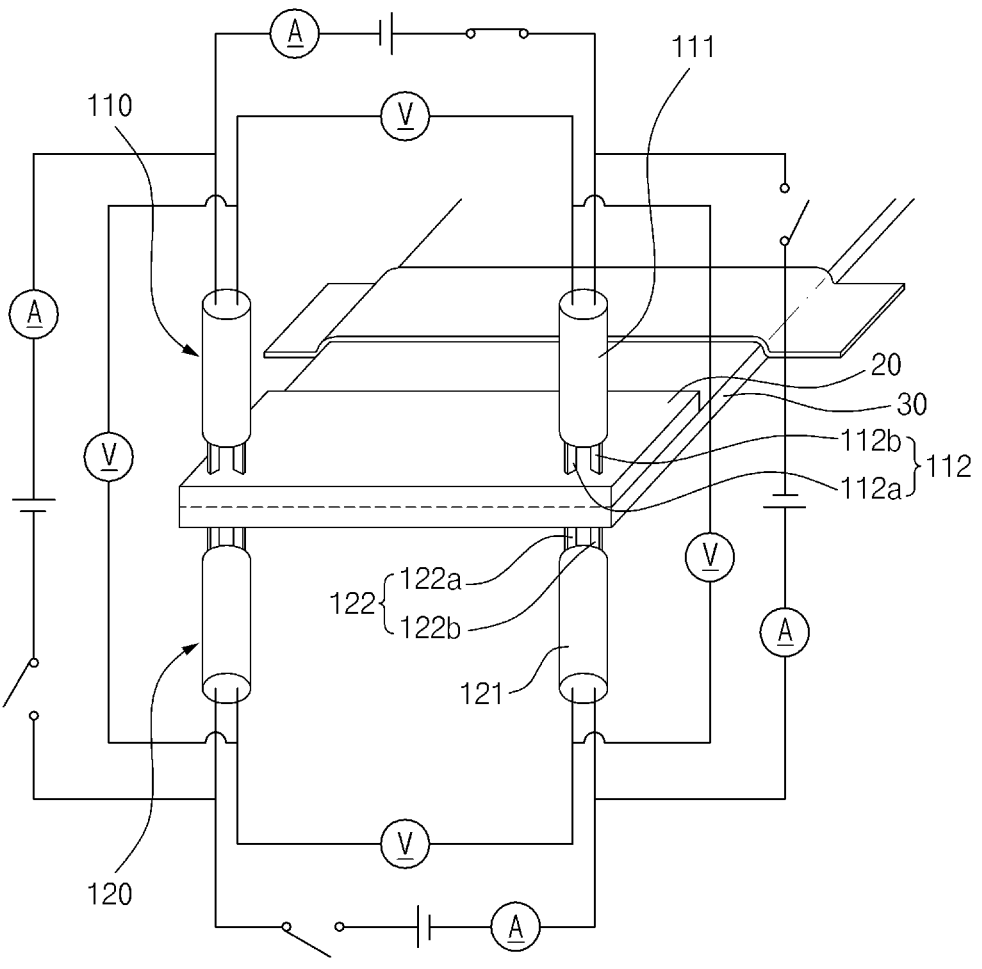
FIG. 2 is a schematic diagram of a device for inspecting a welded state according to an embodiment of the present invention.
Figure 3:
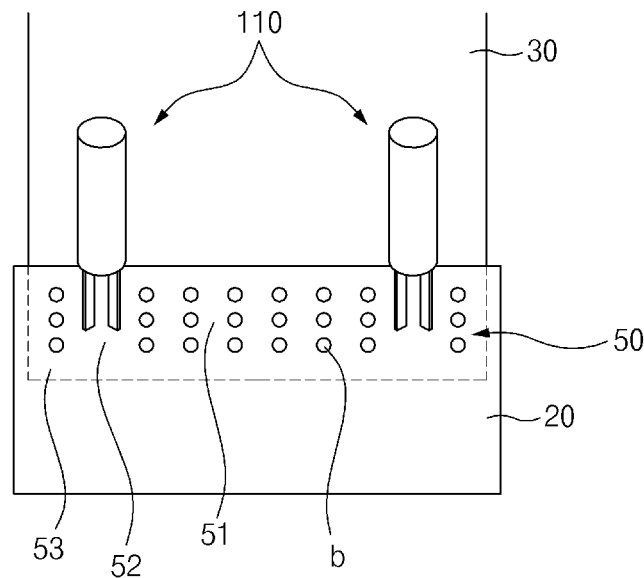
FIG. 3 is a schematic diagram illustrating an operation of the device for inspecting a welded state according to an embodiment of the present invention.

FIG. 2 is a schematic diagram of a device for inspecting a welded state according to an embodiment of the present invention. FIG. 3 is a schematic diagram illustrating an operation of the device for inspecting a welded state according to an embodiment of the present invention.

The device for inspecting a welded state according to an embodiment of the present invention (hereinafter referred to as the "inspecting device") may inspect the welded state between a tab 20 and a lead 30 of an electrode assembly 10.

At least portions of an area 50, in which the tab 20 and the lead 30 face each other, may be welded to each other, and the type of the welding is not limited. For example, the tab 20 and the lead 30 may be welded using any one method among ultrasonic welding, laser welding, and electromagnetic pulse welding.

The inspecting device may include a tab probe 110 in contact with the tab 20, and a lead probe 120 in contact with the lead 30. A pair of tab probes 110 and a pair of lead probes 120 may be probes for measuring micro-resistance.

More particularly, the tab probes 110 may be in contact with the area 50 at a side of the tab 20, and the lead probes 120 may be in contact with the area 50 at a side of the lead 30.

The tab probes 110 may be provided as a pair spaced apart from each other in a width direction of the tab 20. The lead probes 120 may be provided as a pair spaced apart from each other in a width direction of the lead 30. More particularly, the pair of tab probes 110 may be in contact with two side portions in the width direction of the tab 20, and the pair of lead probes 120 may be in contact with two side portions in the width direction of the lead 30.

The tab probes 110 and the lead probes 120 may be disposed to face each other with the tab 20 and the lead 30 therebetween. More particularly, one tab probe 110 of the pair of tab probes 110 may face one lead probe 120 of the pair of lead probes 120. Likewise, the other tab probe 110 of the pair of tab probes 110 may face the other lead probe 120 of the pair of lead probes 120.

Thus, resistance may be measured in a state where the tab 20 and the lead 30 are restrained between the pair of tab probes 110 and the pair of lead probes 120.

A control unit (not illustrated) included in the inspecting device may measure resistance between two probes among the pair of tab probes 110 and the pair of lead probes 120. The control unit may include at least one processor.

Each of probes 110 and 120 may include each of voltage probe members 112a and 122a and each of current probe members 112b and 122b, and the control unit may use a four-wire resistance measurement method. When compared to a two-wire resistance measurement method, the four-wire resistance measurement method is hardly affected by contact resistance, and thus may precisely measure the micro-resistance. The two-wire and four-wire resistance measurement methods are the well-known art, and thus the detailed description thereof will be ruled out.

More particularly, the control unit may measure a first resistance value between the pair of tab probes 110, a second resistance value between one tab probe 110 and one lead probe 120, and a third resistance value between the other tab probe 110 and the other lead probe 120. In addition, the control unit may determine weak-welding between the tab 20 and the lead 30 on the basis of the first to third resistance values. The control unit can also determine the weak-welding between a plurality of tabs 20 on the basis of the first resistance value.

However, an embodiment of the present invention is not limited thereto, and the control unit may further measure a fourth resistance value between the pair of lead probes 120. The control unit may determine the weak-welding between the tab 20 and the lead 30 on the basis of the first to fourth resistance values.

Hereinafter, the detailed structure of each of the probes 110 and 120 will be described.

Each of the probes 110 and 120 may include each of bodies 111 and 121, and a pair of probe members 112 and 122 protruding from each of the bodies 111 and 121.

Each of the bodies 111 and 121 may have a hollow cylindrical shape extending in a direction perpendicular to a surface of the tab 20 or the lead 30. However, the shapes of the bodies 111 and 121 are not limited thereto.

Each of the bodies 111 and 121 may be configured to be movable to approach the tab 20 or the lead 30 or be far away from the tab 20 or the lead 30. For example, a lift mechanism may be connected to each of the bodies 111 and 121. Thus, each of the probes 110 and 120 may be in selective contact with the tab 20 or the lead 30.

Thus, each of the probe members 112 and 122 may protrude from each of the bodies 111 and 121 toward the tab 20 or the lead 30.

Springs 117 and 127 (see FIG. 6), which respectively press the probe members 112 and 122 in a protruding direction, may be provided in each of the bodies 111 and 121. Thus, as the springs 117 and 127 are compressed, the probe members 112 and 122 may be in contact with the tab 20 or the lead 30 to prevent the tab 20 or the lead 30 from be damaged or deformed.

Although not illustrated in FIGS. 2 and 3, each of the bodies 111 and 121 may be provided with each of shields 116 and 126 (see FIGS. 6 and 7) that minimizes exposure of the probe members 112 and 122. Thus, noise may be minimized when the probe members 112 and 122 measure the resistance.

Among the pair of probe members 112 and 122 protruding from each of the bodies 111 and 121, one may be each of the voltage probe members 112a and 122a that detects a voltage, and the other may be each of the current probe members 112b and 122b that applies a current.

Accordingly, the control unit may determine the first resistance value from values of currents flowing through the current probe members 112a of the pair of tab probes 110, and a voltage value measured between the voltage probe members 112b of the pair of tab probes 110.

The control unit may determine the second resistance value from values of currents flowing through the current probe member 112a of one tab probe 110 and the current probe member 122a of one lead probe 120, and a voltage value measured between the voltage probe member 112b of one tab probe 110 and the voltage probe member 122b of one lead probe 120.

The control unit may determine the third resistance value from values of currents flowing through the current probe member 122a of the other tab probe 110 and the current probe member 122a of the other lead probe 120, and a voltage value measured between the voltage probe member 112b of the other tab probe 110 and the voltage probe member 122b of the other lead probe 120.

Thus, the control unit may determine the weak-welding on the basis of the first to third resistance values. For example, the control unit may determine the weak-welding when at least one of the first resistance value, the second resistance value, or the third resistance value exceeds a preset critical resistance value.

Additionally, the control unit may determine the fourth resistance value from values of currents flowing through the current probe members 122a of the pair of lead probes 120, and a voltage value measured between the voltage probe members 122b of the pair of lead probes 120.

In this case, the control unit may determine the weak-welding on the basis of the first to fourth resistance values. For example, the control unit may determine the weak-welding when at least one of the first resistance value, the second resistance value, the third resistance value, or the fourth resistance value exceeds a preset critical resistance value.

The tab probe 110 and the lead probe 120 may not be in contact with a welding bead b formed by welding.

More particularly, the area 50, in which the tab 20 and the lead 30 face each other, may include a central area 51 disposed in a center in a width direction, a side area 53 disposed in each of two end portions in the width direction, and a contact area 52 disposed between the central area 51 and the side area 53 and in contact with the tab probe 110 and the lead probe 120.

A plurality of welding beads b formed by welding may be formed as a group in the central area 51. The welding beads b may be formed also in the side area 53. However, the welding beads b may not be formed in the contact area 52. That is, the tab probe 110 and the lead probe 120 may not be in contact with the welding beads b.

The tab probes 110 and the lead probes 120 may be in contact with the contact area 52 to reduce contact resistance caused by the welding beads b. Thus, more precise measurement of the resistance can be achieved.

In addition, the side area 53 may prevent each of two edges of the area 50 from being separated or delaminated. However, the side area 53 may be minimized so as to precisely measure the welded state. Thus, the length of the central area 51 may be greater than the length of the side area 53 with respect to the width direction of the tab 20 or the lead 30.

Figure 4:
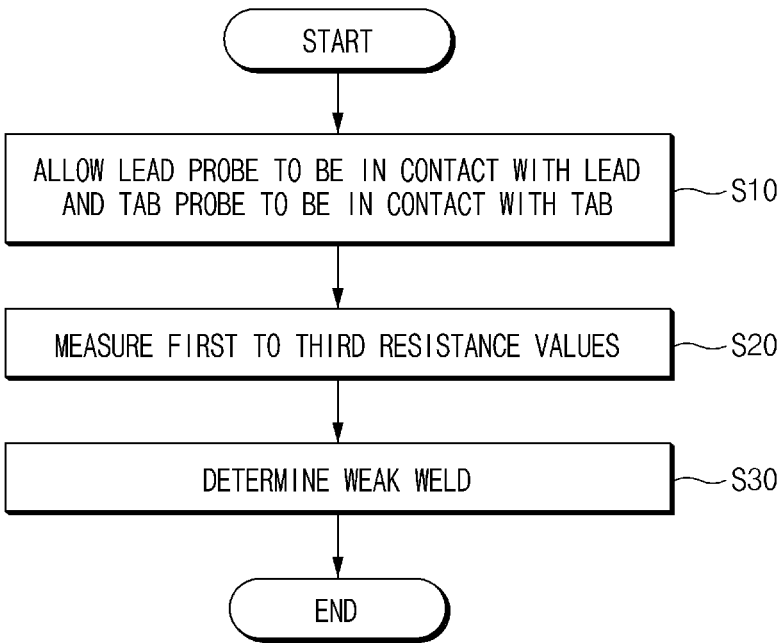
FIG. 4 is a flow chart of a method for inspecting a welded state according to an embodiment of the present invention.

FIG. 4 is a flow chart of a method for inspecting a welded state according to an embodiment of the present invention.

The method for inspecting a welded state according to an embodiment of the present invention (hereinafter referred to as the "inspecting method") may be a method for inspecting a welded state between a tab 20 and a lead 30. That is, the inspecting method may be a method for controlling the inspecting device described above.

The inspecting method may include a probe contact operation (S10), a resistance measurement operation (S20), and a determination operation (S30).

In the probe contact operation (S10), a pair of lead probes 120 may be in contact with the lead 30, and a pair of tab probes 110 may be in contact with the tab 20.

In this case, as described above, the lead probes 120 and the tab probes 110 may be in contact with the contact area 52. The lead probes 120 and the tab probes 110 may be in contact with the contact area 52 at the same time, or may be in contact with the contact area 52 in sequence at a predetermined interval of time.

In the resistance measurement operation (S20), a first resistance value between the pair of tab probes 110, a second resistance value between one tab probe 110 and one lead probe 120, and a third resistance value between the other tab probe 110 and the other lead probe 120, may be measured. In the resistance measurement operation (S20), a fourth resistance value between the pair of lead probes 120 may be further measured. The description above applies to this.

In the determination operation (S30), weak-welding between the tab 20 and the lead 30 may be determined on the basis of the first to third resistance values.

For example, a control unit may determine the weak-welding when at least one of the first to third resistance values exceeds a preset critical resistance value. Here, critical resistance values corresponding to the first to third resistance values may be different from each other.

When the fourth resistance value is further measured in the resistance measurement operation (S20), the determination operation (S30) may be performed by considering not only the first to third resistance values but also the fourth resistance value to determine the weak-welding between the tab 20 and the lead 30. For example, the control unit may determine the weak-welding when at least one of the first to fourth resistance values exceeds a preset critical resistance value. Here, critical resistance values corresponding to the first to fourth resistance values may be different from each other.

The critical resistance values may be preset by processing resistance value data obtained for a sample group in a statistical way. More particularly, the resistance value data, obtained for the group having a large number of samples, follows a normal distribution curve. In the normal distribution curve, an object having a great deviation may be assumed to be a defect in terms of the statistical probability. Thus, in the resistance value data of the sample group represented by the normal distribution curve, a large proportion of the group have values close to an average value, and an object having a deviation greater than the average value may be assumed to be a defect. Thus, a value, which is obtained by adding n times a standard deviation to the average value (n is a natural number), may be set as a critical resistance value. For example, the critical resistance value may be a value obtained by adding 6 times a standard deviation to the average value. In the normal distribution curve, the probability of occurrence of objects, which have a deviation of 6 times a standard deviation compared to the average value, is 0.0000001%. Therefore, even though assumed to be defects caused by weak-welding, resistance values greater than the critical resistance value may have a high enough reliability.

In the determination operation (S30), the weak-welding is determined on the basis of a plurality of resistance values, and thus more precise and accurate measurement may be achieved when compared to a method according to the related art in which the weak-welding is determined on the basis of a single resistance value between a pair of probes.

Figure 5:
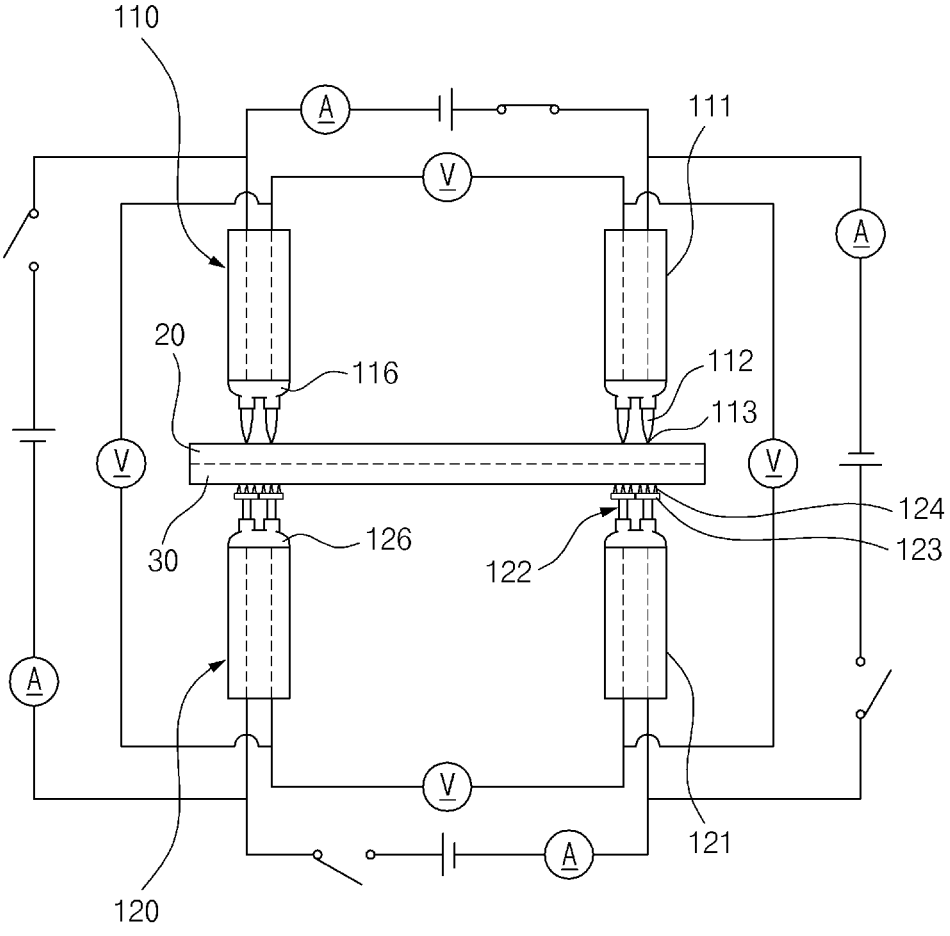
FIG. 5 is a schematic diagram of a device for inspecting a welded state according to another embodiment of the present invention.
Figure 6:
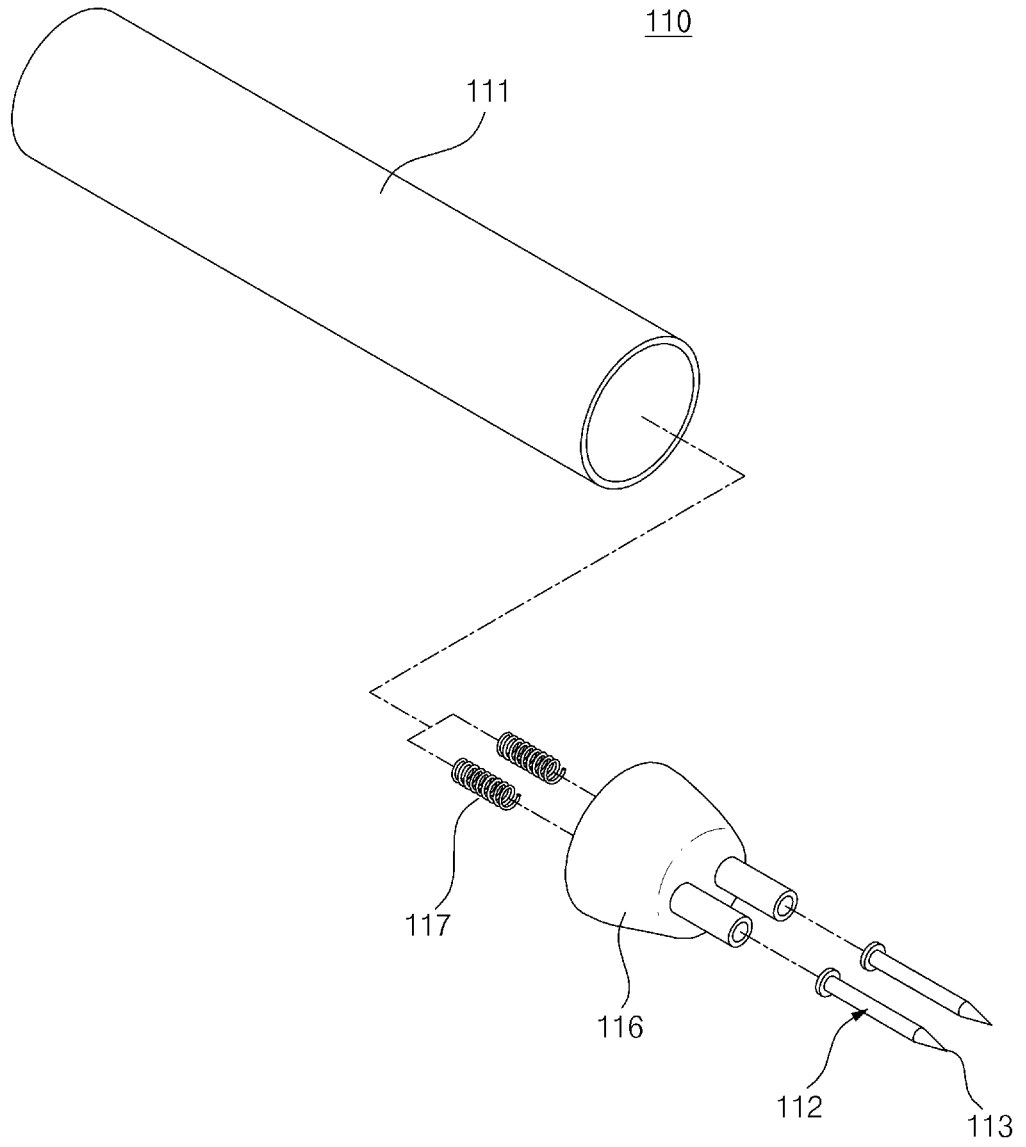
FIG. 6 is an exploded view of a tab probe according to another embodiment of the present invention.
Figure 7:
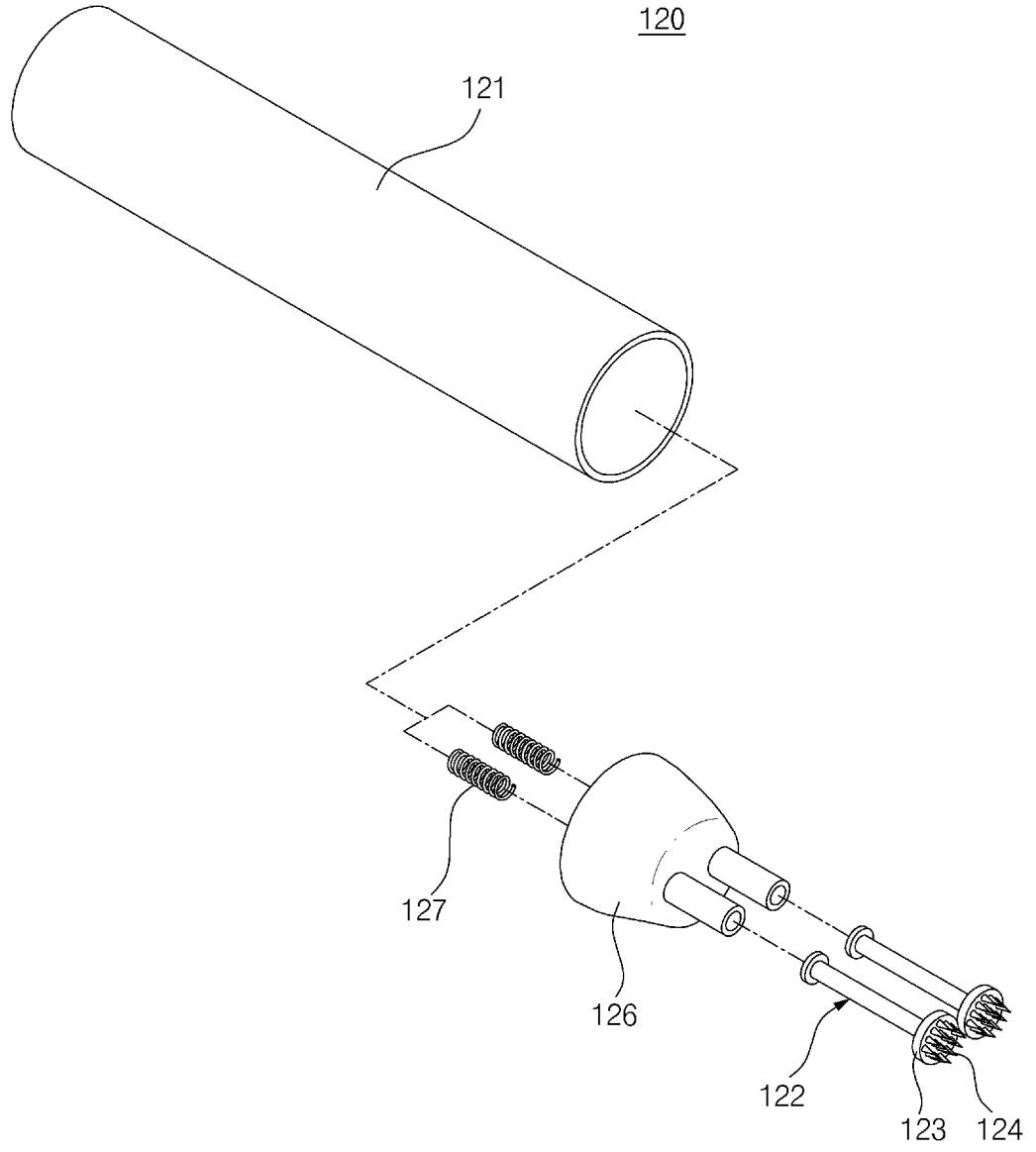
FIG. 7 is an exploded view of a lead probe according to another embodiment of the present invention.

FIG. 5 is a schematic diagram of a device for inspecting a welded state according to another embodiment of the present invention. FIG. 6 is an exploded view of a tab probe according to another embodiment of the present invention. FIG. 7 is an exploded view of a lead probe according to another embodiment of the present invention.

This embodiment is the same as an embodiment describe above, with one exception of each of the probe members 112 and 122. Thus, the content in common may apply, and the description below will be focused on differences.

Each of the probe members 112 and 122 according to this embodiment may have an end provided with a tip 113 in contact with the tab 20 or the lead 30, or may have an end provided with an opposing surface 123 facing the tab 20 or the lead 30, and a plurality of protrusions 124 protruding from the opposing surface 123 to be in contact with the tab 20 or the lead 30.

More particularly, one of the tab probe 110 and the lead probe 120 may include the probe members which each have an end provided with the tip 113, and the other may include the probe members which each have an end provided with the opposing surface 123 and the plurality of protrusions 124.

In relation to this, in the probe contact operation (S10) (see FIG. 4) of the inspecting method using an inspecting device according to this embodiment, the plurality of protrusions 124 may be in contact with one of the tab 20 or the lead 30, and then in contact with the other of the tab 20 or the lead 30.

That is, a contact operation of the tip 113 may be performed in a state where the opposing surface 123 and the plurality of protrusions 124 support the tab 20 and the lead 30 in a large area. Accordingly, a concern about deformation of the tab 20 or the lead 30 caused by the contact operation of the tip 113 may be minimized.

Although the tab probe 110 and the lead probe 120, which face each other with the tab 20 and the lead 30 therebetween, are not correctly aligned with each other, the tab 20 and the lead 30 may be minimized from being deformed by a contact operation of the tab probe 110 and the lead probe 120.

Hereinafter, as illustrated in FIGS. 5 to 7, an example will be described of a case where each of the probe members 112 of the tab probe 110 has the end provided with the tip 113, and each of the probe members 122 of the lead probe 120 has the end provided with the opposing surface 123 and the protrusions 124. The opposite case could be also easily understood by those of ordinary skill in the art.

The pair of probe members 112 provided in each tab probe 110 may each have an end provided with the tip 113 in contact with the tab 20. The tip 113 may protrude outward from a body 111, more particularly, a shield 116.

The tip 113 may be formed to have a cross-sectional area getting narrower towards an end. That is, the tip 113 may have a sharp shape. Thus, when an oxide layer is disposed on a surface of the tab 20, the tip 113 may penetrate the oxide layer, thereby resolving a concern that a resistance value might not be accurately measured due to the oxide layer.

The pair of probe members 122 provided in each lead probe 120 may each have an end provided with the opposing surface 123 facing the lead 30, and the plurality of protrusions 124 protruding from the opposing surface 123 to be in contact with the lead 30.

The opposing surface 123 may have a plate shape extending radially outward from the probe member. The opposing surface 123 may be disposed outside the body 121, more particularly, the shield 126.

Each of the protrusions 124 may be formed to have a cross-sectional area getting narrower towards an end. That is, each of the protrusions 124 may have a sharp shape. Thus, when an oxide layer is disposed on a surface of the lead 30, the protrusions 124 may penetrate the oxide layer, thereby resolving the concern that the resistance value might not be accurately measured due to the oxide layer.

Although exemplary embodiments of the present invention have been described for illustrative purposes, various changes and modifications can be made by those skilled in the art to which the present invention pertains, without departing from essential characteristics of the disclosure. Thus, the embodiments described above are intended to be illustrative and not to limit the technical idea of the present invention. The scope of the technical idea of the present invention is not limited by the embodiments.

The protective scope of the present invention shall be construed on the basis of the appended claims in such a manner that all of the technical ideas included within the scope equivalent to the claims belong to the present invention.

DESCRIPTION OF THE SYMBOLS

20: Tab 30: Lead
51: Central area 52: Contact area
53: Side area 110: Tab probe
111: Body (of tab probe) 112: Probe member (of tab probe)
113: Tip
116: Shield (of tab probe) 117: Spring (of tab probe)
120: Lead probe
121: Body (of lead probe) 122: Probe member (of lead probe)
123: Opposing surface 124: Protrusion
126: Shield (of lead probe) 127: Spring (of lead probe)

The invention claimed is:

1. A device for inspecting a welded state between a tab, which protrudes from a plurality of electrodes stacked with a separator therebetween, and a lead welded to the tab, the device comprising:
   a pair of tab probes, including a first tab probe and a second tab probe, in contact with the tab and spaced apart from each other in a width direction of the tab; and
   a pair of lead probes, including a first lead probe and a second lead probe, in contact with the lead and spaced apart from each other in a width direction of the lead,
   wherein each of the pair of tab probes and the pair of lead probes include a hollow body and a shield,
   wherein each of the first and the second tab probe and the first and the second lead probe includes a pair of probe members, wherein a first probe member of each of the pairs of probe members is configured to apply a current and a second probe member of each of the pairs of probe members is configured to detect a voltage,
   wherein each of the first and second probe members has an end provided with:
      a tip configured to contact the tab or the lead and having a sharp shape; or
      an opposing surface configured to face the tab or the lead, and a plurality of protrusions protruding from the opposing surface to be in contact with the tab or the lead,
   wherein the pairs of probe members of the first tab probe and the second tab probe each have the end provided with the tip, and
   wherein the pairs of probe members of the first lead probe and the second lead probe each have the end provided with the opposing surface and the plurality of protrusions.

2. The device of claim 1, further comprising a control unit configured to determine the presence of a weak-welding on the basis of a first resistance value between the pair of tab probes, a second resistance value between the first tab probe and the first lead probe, and a third resistance value between the second tab probe and the second lead probe.

3. The device of claim 2, wherein the control unit determines the presence of a weak-welding when at least one of the first resistance value, the second resistance value, or the third resistance value exceeds a preset critical resistance value.

4. The device of claim 1, further comprising a control unit configured to determine the presence of a weak-welding on the basis of a first resistance value between the pair of tab probes, a second resistance value between the first tab probe and the first lead probe, a third resistance value between the second tab probe and the second lead probe, and a fourth resistance value between the pair of lead probes.

5. The device of claim 1, wherein the tab probe and the lead probe are disposed to face each other with the tab and the lead therebetween.

6. The device of claim 1, wherein the pair of tab probes are in contact with two side portions in the width direction of the tab, and the pair of lead probes are in contact with two side portions in the width direction of the lead.

7. The device of claim 1, wherein each of the first and second tab probes and the first and second lead probes further comprises a spring configured to apply an elastic force so that the probe members of each of the first and second tab probes and the first and second lead probes protrudes.

8. A method using the device of claim 1 for inspecting the welded state between the tab, which protrudes from the plurality of electrodes stacked with the separator therebetween, and the lead welded to the tab, the method comprising:

allowing the pair of lead probes, including the first lead probe and the second lead probe, to be in contact with the lead and allowing the pair of tab probes, including the first tab probe and the second tab probe, to be in contact with the tab;

measuring a first resistance value between the pair of tab probes, a second resistance value between the first tab probe and the first lead probe, and a third resistance value between the second tab probe and the second lead probe; and determining whether a weak-welding is present on the basis of the first resistance value, the second resistance value, and the third resistance value.

9. The method of claim 8, wherein the presence of weak-welding is determined when at least one of the first resistance value, the second resistance value, or the third resistance value exceeds a preset critical resistance value.

10. The method of claim 8, further comprising measuring a fourth resistance value between the pair of lead probes, and the fourth resistance value is further considered to determine the presence of weak-welding.

11. The method of claim 8, wherein the pair of lead probes are in contact with two side portions in the width direction of the lead, and the pair of tab probes are in contact with two side portions in the width direction of the tab.

12. The method of claim 8, wherein the pair of lead probes and the pair of tab probes are disposed to face each other with the tab and the lead therebetween.

13. The method of claim 8, wherein each of the first and second tab probes and the first and second lead probes includes a pair of probe members, a first probe member of each of the pairs of probe members being configured to apply a current and the second probe member of each of the pairs of probe members being configured to detect a voltage, wherein either the pair of tab probes or the pair of lead probes includes the pair of probe members which each have an end provided with a tip, and the other of the pair of tab probes and the pair of lead probes includes the pair of probe members which each have the end provided with an opposing surface facing the tab or the lead, and a plurality of protrusions protruding from the opposing surface.

14. The method of claim 13, wherein the plurality of protrusions are configured to contact one of the tab or the lead, and the tip is in contact with the other of the tab or the lead.

15. The method of claim 8, wherein an area, in which the lead and the tab face each other, comprises:

a central area disposed in a center in a width direction and having welding beads formed therein;

a side area disposed in each of two end portions in the width direction and having the welding beads formed therein; and a contact area disposed between the central area and the side area and having no welding beads formed therein, wherein the pair of lead probes and the pair of tab probes are in contact with the contact area.

* * * * *